J. P. Gruber,

Beer Cooler.

No. 100,027. Patented Feb. 22, 1870.

Witnesses

Inventor

United States Patent Office.

JOHN P. GRUBER, OF NEW YORK, N. Y.

Letters Patent No. 100,027, dated February 22, 1870.

---

IMPROVEMENT IN APPARATUS FOR COOLING AND PURIFYING BEER, WATER, AND OTHER LIQUIDS.

---

The Schedule referred to in these Letters Patent and making part of the same

---

*To all whom it may concern:*

Be it known that I, JOHN P. GRUBER, of the city and county of New York, in the State of New York, have invented a new and improved Apparatus for Cooling and Purifying Liquids; and I do hereby declare that the following is a full, clear, and exact description thereof, reference being had to the accompanying drawings making part of this specification, in which—

Figure 1:
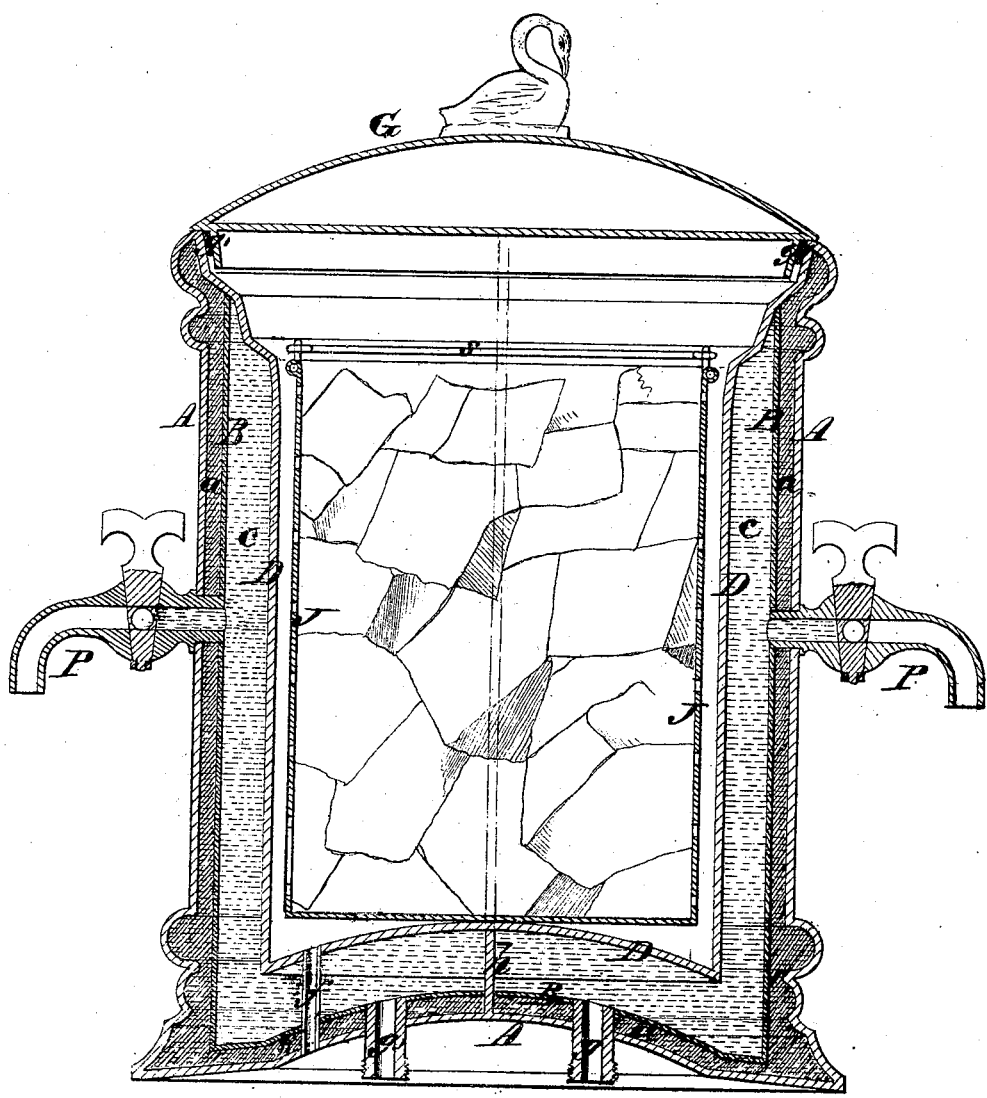
Figure 2:
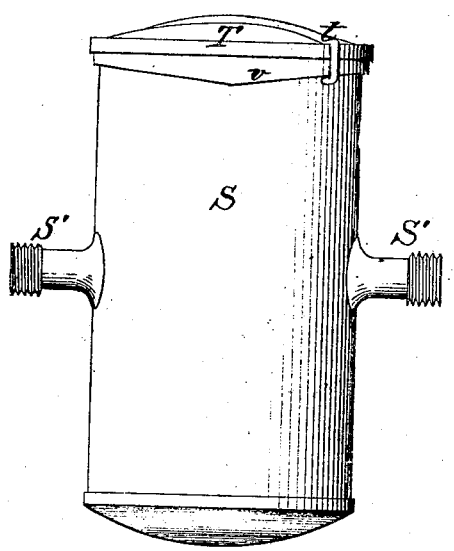
Figure 3:
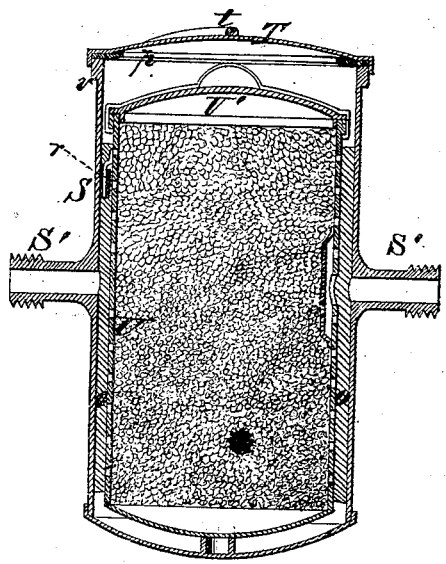
Figure 5:
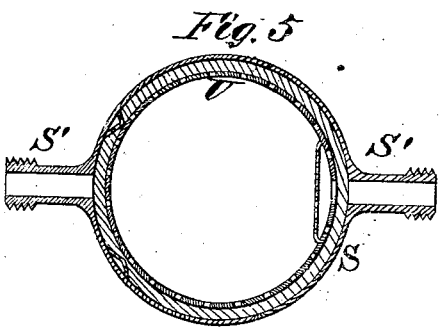
Figure 4:
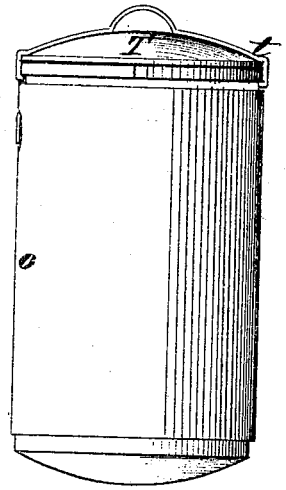

Figure 1, plate 1, is a diametrical section through the improved cooler, without the filter attachment.

Figures 2, 3, 4, and 5, plate 2, show the manner of constructing the filter.

Similar letters of reference indicate corresponding parts in the several figures.

This invention relates to a new and improved mode of constructing coolers for water, beer, and other liquids which are under pressure, such, for instance, as the water which is supplied to buildings from reservoirs, and beer which is raised from a lower to a higher point by pressure applied to the barrel containing it.

My invention consists in an apparatus whereby liquids under pressure can be readily and conveniently cooled and filtered without bringing them in direct contact with the ice, at the same time to provide for readily supplying the ice and keeping the apparatus clean, as will be hereinafter explained.

To enable others skilled in the art to understand my invention, I will describe its construction and operation.

In the accompanying drawings, fig. 1, I have represented the improved cooler in section, and shown its annular liquid-chamber divided centrally by a vertical partition, $h$, and provided with two inlet-pipes $g\ g$ and two draw-off cocks P P.

The object of thus constructing the cooler is to adapt it for cooling two kinds of liquids at the same time. If it is intended for cooling one kind of liquid only, the vertical partition will be omitted, and, if desired, one of the draw-off cocks may be omitted.

The body of the cooler consists of an outer wall, A, and an inner wall, B, containing between them charcoal, or other suitable heat non-conducting material, which will prevent the condensation of moisture on the outer wall, and also prevent the rapid conduction of heat to an inner chamber, $c$.

The chamber $c$ is inclosed between the walls B and D, and is intended for receiving liquid to be cooled, which liquid is conducted into this chamber $c$ through a pipe, $g$, that is connected to a pipe leading to a reservoir or head.

Within the chamber inclosed by the inner wall D is a bucket, J, which is made either of thickly perforated sheet metal or of wire-gauze, and which is provided with a bail by which it can be lifted out of or introduced into the cooler. This bucket is designed for containing ice, the water from which is conducted off through the pipe $f$ that extends through the three bottom walls A, B, and D, as shown.

The cover G is made with double walls and provided around its rim with an India-rubber packing-ring, $g'$, which will allow the cover to be fitted tightly in place.

In figs. 2, 3, 4, and 5, I have represented a device which is adapted for use in combination with the cooler above described for filtering and purifying a liquid before it enters the chamber $c$ in the cooler. This filter consists of an outer shell, S, which is provided with two pipes, S' S', applied diametrically to each other at the middle of its length; also, with a cover, T, which is secured in place by hooks $t$ engaging with the double oblique shoulders $v$; also, with a packing, $p$, for making a tight joint between the cover and the end of the cylinder or shell S.

Within this shell S is a cylinder, U, which is thickly perforated and provided with a removable cover or cap, U'.

This inside cylinder is shorter and of less diameter than the shell S, and the space left between the two is filled with felt cloth O, or some other suitable filtering material. The cylinder U is also filled with gravel, fine sand, or other suitable filtering and purifying material.

To prevent clogging up of the pipes S' S', perforated ribs may be interposed between the inner and outer walls, or other suitable means may be adopted for this purpose.

The filter is applied to the cooler by means of a coupling, which is screwed to the pipe $g$ and to one of the pipes S'. The opposite pipe S' is fastened by a coupling to the pipe through which the liquid is forced from a reservoir. The filter is thus arranged horizontally beneath the cooler, and its contents can be readily removed and cleansed by removing the cap or cover T and the inside cylinder U.

It will be seen from the above description that I have a refrigerating and filtering apparatus for liquids, resembling, in external appearance, a well-known form of water-cooler; that I provide within the cooler a receptacle for ice, and between the wall of the cooler is a chamber for the liquid to be cooled.

I establish a communication between the service-pipe and the liquid-chamber through a filtering apparatus, so that before the liquid enters the said chamber it is filtered. I provide for readily cleansing the filtering material in the filtering apparatus without disconnecting it from the cooler or the service-pipe, for which purpose the removable heads or covers T and U are employed, together with a shut-off cock, which should be applied to the service-pipe below the filter.

Having described my invention,

What I claim as new, and desire to secure by Letters Patent, is—

1. A liquid-cooler adapted for cooling liquids under pressure from a reservoir or other head, which consists of a liquid-chamber inclosing an ice-chamber, and inclosed by a non-conducting wall, in combination with an in-flow pipe, $g$, and a draw-off cock, P, substantially as and for the purposes described.

2. The removable ice-bucket J, in combination with the cooler, substantially as herein described.

3. A filtering apparatus, constructed substantially as described, in combination with the liquid-cooler, constructed substantially as described.

JOHN P. GRUBER.

Witnesses:
WILLIAM HAENSEL,
JAMES P. FARRELL.